June 28, 1927.

O. LARSEN

VALVE

Filed Oct. 27, 1926

1,634,075

Inventor
Olaf Larsen,
By Hewitt & Dixon
Atty.

Patented June 28, 1927.

1,634,075

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

VALVE.

Application filed October 27, 1926. Serial No. 144,481.

The invention relates to valves for the control of the flow of edible fluids and known as sanitary valves.

In the preparation of milk for food consumption one of the processes employed is Pasteurization by which the pathogenic bacteria are destroyed. The common method of Pasteurization is to hold quantities of milk at a pre-determined temperature for a pre-determined time in insulated or heated containers. The milk is ordinarily treated in successive batches, the containers being filled and emptied through sanitary piping controlled by sanitary valves positioned at the inlets and outlets of the containers. It will be obvious that any leakage or failure in these valves will permit the uncontrolled flow through the container of a quantity of milk which has not been held for the required time at the necessary temperature. If such leakage is permitted to pass into the discharge conduits with the properly Pasteurized milk the latter is in danger of reinoculation by the undestroyed bacteria in the milk which has escaped the prescribed treatment.

Also it is obviously necessary that all containers, piping and controlling valves used in the treatment of milk for food consumption be kept in a sanitary condition. This requires that such apparatus be constructed so that the parts may be readily disassembled for thorough cleaning after their operative use. It is the principal object of this invention to provide an improved sanitary valve which is constructed to direct outwardly from the main passages any leakage occurring in the valve when it is in closed position. A further object is to provide a valve of simple construction which may be conveniently and quickly taken apart for cleaning.

Other objects and advantages will be apparent in the following description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Figure 1:
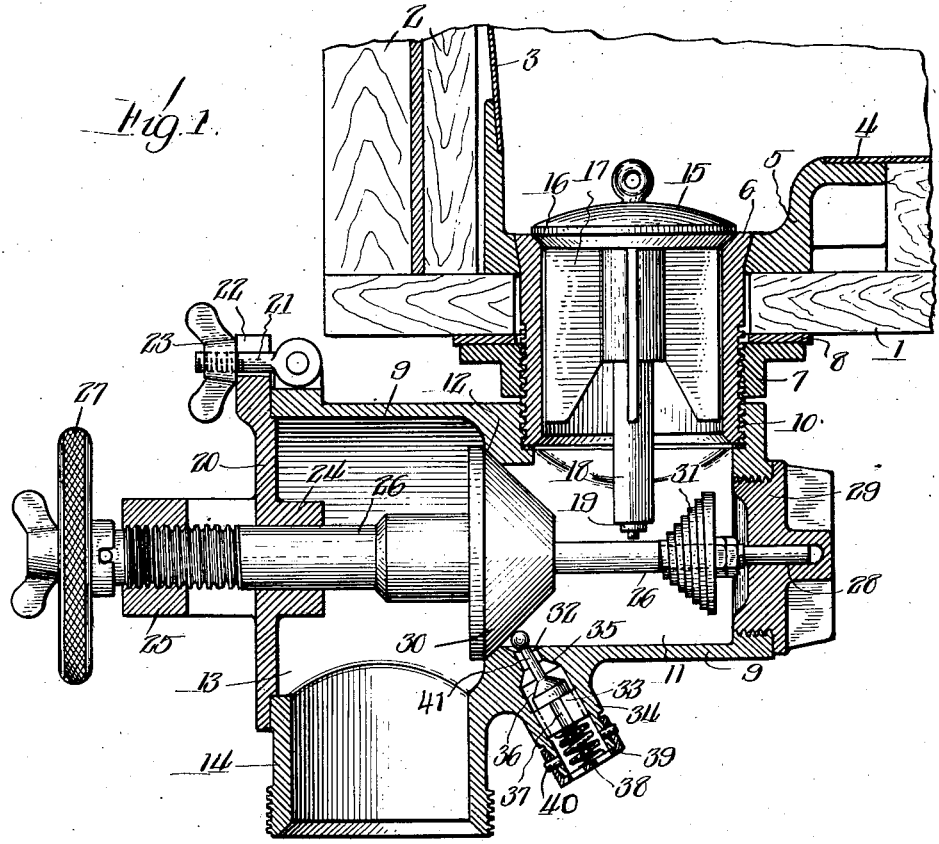
Figure 2:
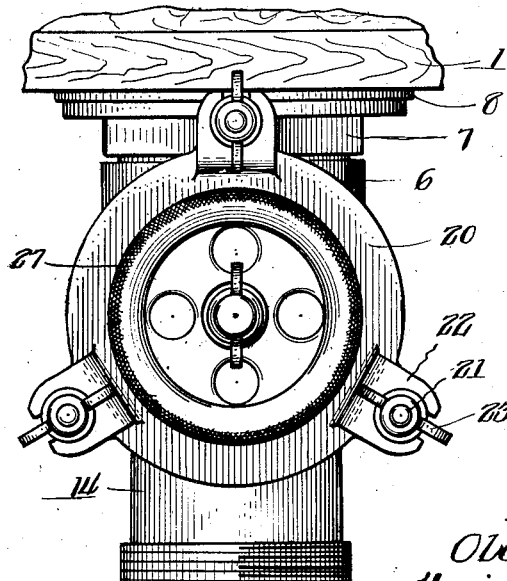

Referring to the drawings Fig. 1 is a sectional side elevation of the valve and Fig. 2 is a front elevation of the same.

The reference numeral 1 indicates the bottom frame-work of a liquid holding vat, and the numeral 2 indicates the side members thereof. Appropriate metallic lining, indicated at 3 and 4, is joined to an outlet well structure 5 mounted upon the framework. The valve structure comprises a sleeve 6 having its preferably tapered upper end seated in the outlet opening through the well structure 5 and endwardly flush therewith. The sleeve 6 extends through the frame-work of the vat and may be secured in place by means of a flanged nut 7 screw threaded upon the sleeve 6 and bearing upon a washer 8 clamping the wall of the vat.

The sleeve 6 forms the upper part of the valve casing, the lower main portion 9 of the casing being mounted on the sleeve portion preferably in screw threaded relation as indicated at 10. The lower portion of the casing encloses a chamber 11 in open communication with the sleeve portion and having a lateral outlet opening 12 entering a frontward space 13 from which is provided a tubular extension 14 of the casing suitably arranged for connection with sanitary piping for conducting away the liquid discharged through the valve structure.

The valve casing inlet opening at the upper end of the sleeve portion 6 is controlled by a reciprocatory valve 15, commonly known as the poppet type, and having a tapered seat 16 in the upper end of this sleeve. The valve 15 is preferably guided in its operative movement by vanes or wings 17 extending into the sleeve portion 6 and bearing laterally thereupon. An axial stem 18, carried by the valve 15, extends into the chamber 11, the end portion of the stem preferably being provided with concentric annular steps 19 for engagement with the valve operating means hereinafter described.

The lower portion 9 of the casing is provided at the front end with a removable cover plate 20 normally secured in position by means of swinging eye bolts 21 pivoted between suitable lugs carried by the casing structure and extending through slotted flanges 22 formed on the cover plate. Thumb nuts 23, positioned on the screw threaded end portions of the eye bolts, bear upon the flanges 22 and retain the cover plate in position.

The cover plate 20 is provided with a central hub 24 and an outer supporting bracket 25 in which is operatively mounted a valve spindle 26 having a smooth bearing in the hub 24 and screw threaded engagement with the bracket 25. The outer end of the spindle is provided with an operating hand wheel 27 suitably secured to the spindle. The spindle 26 extends inwardly of the valve casing and through the chamber 11, being disposed in angular relation to the axis of movement of the valve 15 and its stem 18. The spindle 26 is preferably supported at its inner end by having a bearing 28 in a removable plug 29 mounted in the rear end wall of the casing.

A valve 30, mounted on the mid-portion of the spindle 26, controls the chamber outlet opening 12, preferably being of conical form and having its seat upon the tapered margin of the chamber outlet opening. Mounted upon the valve spindle within the chamber 11, is a spirally formed member 31 comprising a spiral screw cam having a pitch equal to the pitch of the screw thread in the outer end of the spindle 26 by which the latter is operated in advancing or withdrawing the outlet controlling valve 30. The spiral cam 31 is adapted to engage the stepped end 19 of the inlet valve stem 18 in the operation of withdrawing or opening the outlet valve 30, and with the continued operation of its spindle 26 to lift the inlet valve stem 18 upon the radially increasing spiral steps of the cam member 31 until, with the complete withdrawal of the outlet valve 30, the inlet valve 15 has been fully lifted into open position. With the reverse movement of the valve spindle 26, the inlet valve 15 is lowered into closed position with the closing of the outlet valve 30.

The cam member 31 is positioned on the valve spindle 26 in relation to the inlet valve stem 18 so that engagement with the latter in the opening operation does not occur until the outlet valve 30 has been partially opened, and in the reverse movement the inlet valve 15 is closed for a period before the outlet valve 30 reaches its seat. This arrangement provides in the latter case for the full drainage from the chamber of the liquid therein, when the inlet valve is closed, before the complete closing of the outlet valve.

Opening from the chamber 11 is an auxiliary outlet 32 provided for the diversion from the chamber of any liquid leaking thereinto when the inlet and outlet valves are in closed position. The auxiliary outlet 32 is controlled by a valve 33 slidably positioned in a tubular extension 34 formed on the casing 9, the inner diameter of which is greater than the auxiliary outlet opening, thereby forming a shoulder 35 preferably tapered to form a seat for the tapered end 36 of the valve 33. The valve 33 is provided with longitudinal channels 37 for the passage thereby of liquid escaping through the auxiliary outlet. The valve 33 is normally held to its seat by means of a coiled spring 38 bearing upon its outer end and confined by a perforated cap 39 having suitable bayonet slots for receiving the pins 40 mounted in the tubular extension 34 and removably securing the cap in position.

The operation of the auxiliary valve 33 is accomplished by means of a stem 41 extending through the auxiliary outlet opening in spaced relation thereto, and having its preferably rounded inner end positioned for engagement by the outlet valve 30 as the latter approaches its seat in closing operation. By this means the auxiliary outlet valve 33 is removed from its seat and the auxiliary outlet opened when the main outlet valve 30 is in closed position. Upon the opening of the main outlet valve the valve 33 is seated by the spring 38, and the auxiliary outlet opening 32 is closed.

In disassembling the valve for cleaning purposes it is necessary only to lift the inlet valve 15 and its attached structure from the sleeve portion 6 of the casing and to remove the casing cover plate 20, withdrawing therewith the outlet valve and its operating spindle and cam, thereby exposing the interior of the casing and all of the valve parts for thorough cleaning.

I claim as my invention:

1. A device of the class described, characterized by having a chamber with an inlet opening and an outlet opening, valves controlling said openings operable upon longitudinal axes in angular relation to each other, one of said valves having a portion extending into said chamber, the other of said valves having a portion extending into said chamber adjacent the extended portion of said first valve, said second valve being operable with a rotary movement, and a spirally formed member mounted on the extended portion of said second valve adapted to engage the extended portion of said first valve and move said first valve into open position with the opening movement of said second valve.

2. A device of the class described, comprising a casing having a chamber with an inlet opening and an outlet opening, a valve controlling said inlet opening having a stem extending into said chamber, a valve controlling said outlet opening having a spindle extending into said chamber in proximity to said inlet valve stem, said outlet valve being operable with a screw movement, and a spiral screw cam mounted on said outlet valve spindle adapted to engage said inlet valve stem and open and close said inlet valve with the opening and closing movement of said outlet valve.

3. A device of the class described, comprising a casing having a chamber with an inlet opening and an outlet opening, a valve controlling said inlet opening having a stem extending into said chamber, a valve controlling said outlet opening having a spindle extending into said chamber in proximity to said inlet valve stem, said outlet valve being operable with a screw movement, and a spiral screw cam mounted on said outlet valve spindle adapted to engage said inlet valve stem and open and close said inlet valve with the opening and closing movement of said outlet valve, said cam being positioned for delayed engagement with said inlet valve stem whereby said inlet valve is opened after said outlet valve is opened and is closed before said outlet valve is closed.

4. A device of the class described, comprising a casing having a chamber with an inlet opening and an outlet opening, a valve controlling said inlet opening having a slidable bearing therein and having a stem extending into said chamber, a valve controlling said outlet opening, a screw-actuated spindle operatively supporting said outlet valve, said spindle extending into said chamber and having a bearing in the wall thereof, and a spiral cam mounted on said spindle having a pitch similar to the pitch of said screw-actuated spindle and adapted to operatively engage said inlet valve stem.

5. A device of the class described, comprising a casing having a chamber with an inlet opening and an outlet opening and with an auxiliary opening intermediate of said inlet and outlet openings, valves controlling said inlet and outlet openings operable upon longitudinal axes in angular relation to each other, said valves having portions thereof extending into said chamber, one of said valves being operable with a screw movement and having a spiral cam on its extended portion adapted to operatively engage the extended portion of the other of said valves, and a valve normally closing said auxiliary opening having a portion extending into said chamber for engagement by one of said first mentioned valves whereby said auxiliary valve is opened when said inlet and outlet valves are closed.

In witness whereof I have hereunto attached my signature.

OLAF LARSEN.